United States Patent [19]

Andersson et al.

[11] Patent Number: 4,650,092
[45] Date of Patent: Mar. 17, 1987

[54] DEVICE FOR THE EJECTION OF BOXES THROUGH THE EXIT OF A CONTAINER AND BOX ADAPTED FOR USE IN SUCH A DEVICE

[75] Inventors: Nils A. T. Andersson, Järfälla; Bo S. Lindgren, Spanga, both of Sweden

[73] Assignee: U.S. Philips Corporation, New York, N.Y.

[21] Appl. No.: 604,279

[22] Filed: Apr. 26, 1984

[30] Foreign Application Priority Data

May 3, 1983 [SE] Sweden ................................ 8302508

[51] Int. Cl.⁴ .............................................. B65H 3/32
[52] U.S. Cl. .................................... 221/222; 221/226; 221/231; 414/123; 414/129
[58] Field of Search ................... 221/26, 42, 222, 231, 221/226; 414/123, 129, 128, 125, 120; 206/509, 512, 511

[56] References Cited

U.S. PATENT DOCUMENTS 3,391,827 7/1968 Govatsos ........................ 221/226 X
3,455,484 7/1969 Edwards ............................. 221/222

Primary Examiner—Charles A. Marmor
Assistant Examiner—David H. Bollinger
Attorney, Agent, or Firm—Robert J. Kraus

[57] ABSTRACT

A device for the ejection of boxes through the exit of a container and a box adapted for use in such a device. A device (1) for ejection of boxes (30) through an exit (3) of a container (2). Such a device (1) may be used for the ejection of chaff for the purpose of radar jamming. The device (1) is provided with gear wheels (13, 13') located adjacent to the exit (3). In order to eject chaff boxes (30) the gear wheels (13, 13') engage with peripherally located gears (37, 38) on the boxes (30). Ejection by means of such a gear arrangement enables the number of boxes (30) released and the time interval between subsequent releases to be controlled very accurately.

12 Claims, 9 Drawing Figures

DEVICE FOR THE EJECTION OF BOXES THROUGH THE EXIT OF A CONTAINER AND BOX ADAPTED FOR USE IN SUCH A DEVICE

BACKGROUND OF THE INVENTION

The invention relates to a device for ejection of boxes through an exit of a container, comprising a transport mechanism which ejects the boxes one by one.

In a known device of the above kind (U.S. Pat. No. 2,954,948) the boxes are arranged in a vertical stack in an upstanding container. Downward movement of the boxes in the container is obtained by the force of gravity. Just before ejection of one of the boxes the remaining stack of boxes tends to tilt with respect to the container so that there exists a considerable risk that the remaining boxes will jam in the container. The risk of jamming increases when the container is somewhat inclined with regard to the direction of the force of gravity during ejection.

SUMMARY OF THE INVENTION

It is an object of the invention to provide a device for ejection of boxes wherein the risk of jamming of the boxes in the container is avoided in all positions of the container with respect to the direction of the force of gravity.

In accordance with the invention the transport mechanism is provided with a first gear means located adjacent to the exit and engageable with seond gear means which is part of each of the boxes.

An additional object of the invention is to provide a device for ejection of boxes which causes a final push to the box which is ejected.

This object of the invention is accomplished by including each of the boxes in a train of boxes which is slidable in the container by the transport mechanism, adjacent boxes remaining attached to each other by flexible latching means on each box during transport up to the first gear means. The first gear means disengages adjacent boxes by unlocking the flexible latching means while subsequently ejecting one of each of two adjacent boxes and retaining the other one by cooperation with said gear means.

A further object of the invention is to provide a device for ejecting boxes wherein the boxes are protected against damage during transport in the container.

This object of the invention is accomplished by providing as part of the transport mechanism a piston which is slidable in the container and which is spring-biased against a train of boxes.

Still another object of the invention is to provide a box with a particular shape which is adapted to the first gear means of the transport mechanism.

This object of the invention is achieved by including in the box two opposite side walls which include the second gear means.

BRIEF DESCRIPTION OF THE DRAWINGS

The invention will be described in more detail with reference to the accompanying drawing, in which.

DESCRIPTION OF THE PREFERRED EMBODIMENT

Figure 1:
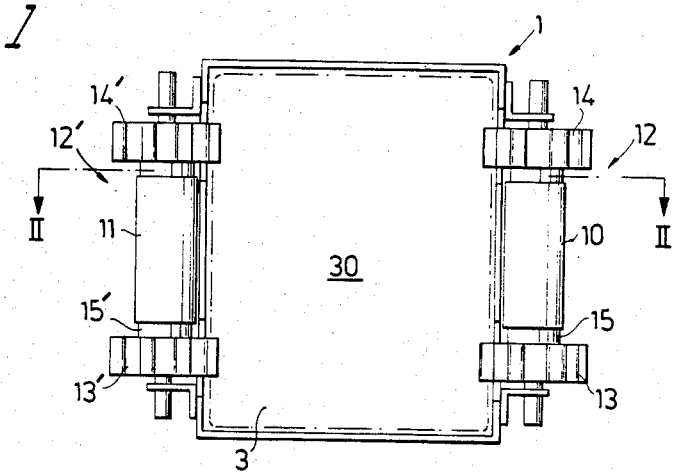
FIG. 1 shows a frontview of the ejection device.
Figure 2:
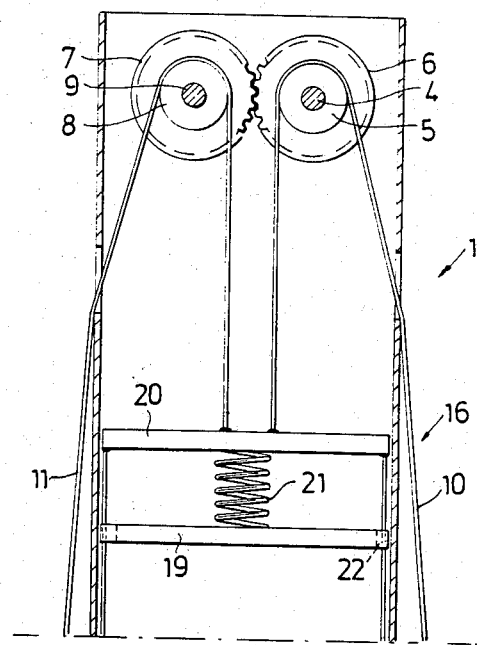
FIG. 2 shows a longitudinal cross-section of the ejection device along the line II—II in FIG. 1.
Figure 2:
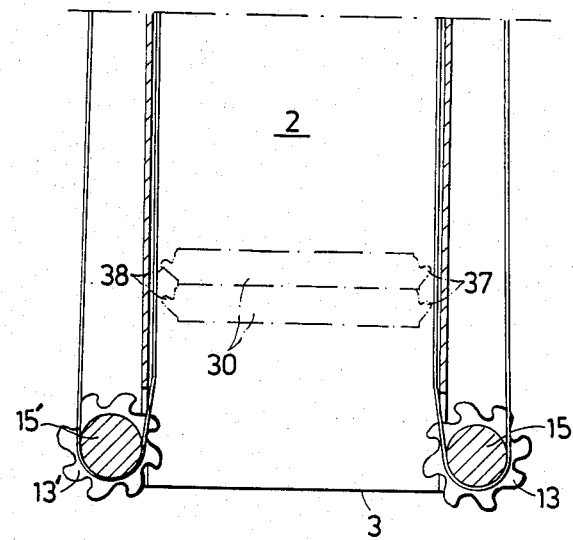

In FIGS. 1 and 2 an ejection device 1 for dispensing chaff is shown which comprises a container 2 for chaff boxes 30 and a drive mechanism (elements 4–21) for driving a train of boxes to an exit 3 of the container 2 and for the separation and ejection of boxes 30 at the exit 3. For transporting the slidable train of boxes 30 and separating them one by one, a driving motor (not shown) drives a first shaft 4 on which a belt pulley 5 and a gear wheel 6 are fixedly arranged. The gear wheel 6 cooperates with a similar gear wheel 7 which together with a belt pulley 8 is fixedly arranged on a second shaft 9 arranged parallel to the first shaft 4. The shafts 4 and 9 are arranged adjacent to the end of the container situated farthest from the exit 3 of the container. Adjacent to exit 3 the first gear means includes gear arrangements 12 and 12' are arranged opposite to each other. The gear arrangements 12 and 12' comprise pairs of gear wheels 13, 14 and 13', 14', respectively (FIG. 1). The pairs are rigidly arranged on parallel common shafts 15 and 15', respectively. The gear wheels 13, 14 and the common shaft 15 may be formed as one piece as may the gear wheels 13', 14' and the common shaft 15'. Driving belts 10 and 11 respectively are connected to the two gear units 12 and 12'. The ends of the driving belts 10 and 11 are attached to a compressible piston 16 which is slidably arranged in the container 2. The piston 16 comprises two parallel plates 19 and 20 with a spring 21 therebetween. In the illustrated embodiment the ends of the belts 10 and 11 are fixed to the plate 20 situated farthest from the exit 3 of the container 2. The front plate 19 is provided with recesses 22 to enable passage of the driving belts 10 and 11. In FIG. 2 the position of two chaff boxes 30 has been indicated with dash-dot lines. In reality, however, the complete container space between the piston 16 and the exit 3 is filled with chaff boxes 30.

Figure 3:
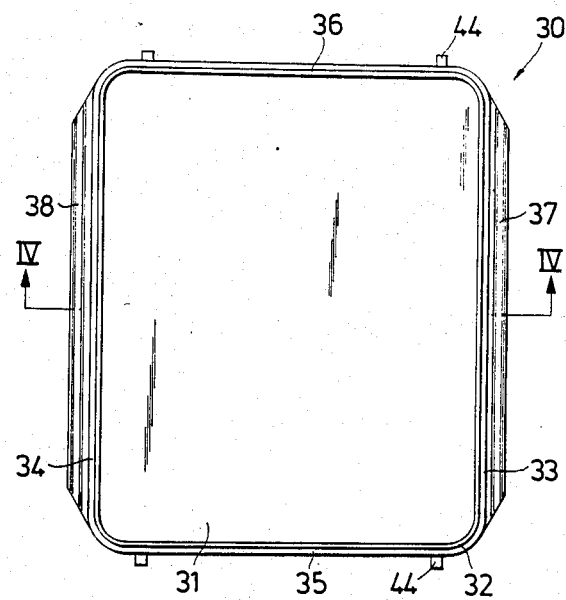
FIG. 3 shows a box adapted to the ejection device according to FIGS. 1 and 2.
Figure 4:
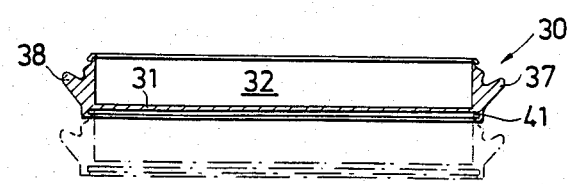
FIG. 4 shows a cross-section through the box according to FIG. 3 along the line IV—IV.

FIGS. 3 and 4 show a chaff box 30 adapted to the described transport mechanism. The box 30 includes a bottom plate 31 and four side walls 32. Side walls 32 are constituted by two oppositely arranged straight parallel side walls 33 and 34 and two side walls 35 and 36 connecting the parallel side walls 33 and 34.

The bottom plate 31 of box 30 closes an adjacent box. The adjacent box is indicated with dash-dot lines in FIG. 4. Chaff of several lengths adapted to different frequency ranges is kept in the boxes. The chaff may be of, for example, foil or glassfiber type.

The opposite parallel side walls 33 and 34 are provided with second gear means 37 and 38. In the embodiment shown the second gear means consist of oblong projecting parts 37 and 38 integrally formed in a the side walls 33 and 34. The projecting parts 37 and 38 are somewhwat inclined. Alternatively, each of the projecting parts 37 and 38 may be constituted by more than one gear element. For example a separate gear element may be provided for each of the first gear wheels 13, 14, 13', 14' arranged adjacent to the exit 3 of the container 2.

In order to obtain a reliable coupling of adjacent boxes the side walls 32 may be tapered close to the boxes in front of and behind it in such a way that the boxes can be nested in each other. As an alternative, the side walls 32 may be given a somewhat conical shape in order to obtain a reliable coupling between the boxes. Moreover, the boxes 30 are provided with flexible latching means in order to connect adjacent boxes to each other. A latching means comprises, as is most apparent from FIGS. 6a and 6b, a flexible projection 41 formed in the side walls 32 of a box and a recess 42 likewise formed in the side walls 32 of a box. In an assembled position a projection 41 in one box 30 engages with a recess 42 in an adjacent box 30. A further flexible projection 43 may be arranged adjacent to the projection 41. This projection 41 constitutes a point of action for activating the latching means.

Furthermore ridges 44 may be provided on the outside of the side walls 32 (FIG. 3). These ridges cause a reduction of the friction between a train of attached boxes 30 and the walls of the container 2.

The operation of the ejection device will now be described in more detail with reference to FIGS. 1, 2, 5 and 6.

The container 2 is filled by rotating the gear wheels 12 and 12' so that a train of attached chaff boxes 30 can be inserted in the container 2 through exit 3 and pushed against the piston 16. The gear wheels 12 and 12' are then rotated so that they engage with the second gear means on the box being situated closest to the container exit 3. The compressible piston 16 biases the train of boxes in the direction towards the exit 3.

Ejection of chaff boxes is initiated by starting a drive motor which rotates the shaft 4 supporting the belt pulley 5 and the gear wheel 6. The gear wheel 6 rotates the gear wheel 7 and the belt pulley 8. The belt pulley 5 drives the belt 10 which via the shaft 15 rotates the gear wheels 13 and 14 of first gear means 12. The belt pulley 8 in the same way drives the belt 11 which via a shaft 15' rotates the gear wheels 13' and 14' of first gear means 12'. For guiding of the driving belts the drive mechanism may be supplemented with guide rollers. For example, guide rollers which serve to guide the belts towards the outer walls of the container may be arranged on the outside of the container close to the first gear means. The gear wheels 13, 14, 13', 14' engage with the corresponding second gear means 37, 38 of the chaff boxes and ensure that the boxes 30 are ejected one by one. The compressible piston 16 exerts a force on the train of boxes in the direction towards the container exit and ensures by means of its compressibility that the boxes, the gear means 12, 12', the belts 10, 11 and even the further parts of the drive mechanism are not subjected to damaging forces.

The cooperation between the first gear means of the transport mechanism and the second gear means of the boxes will now be described in more detail with reference to FIGS. 5 and 6.

Figure 5A:
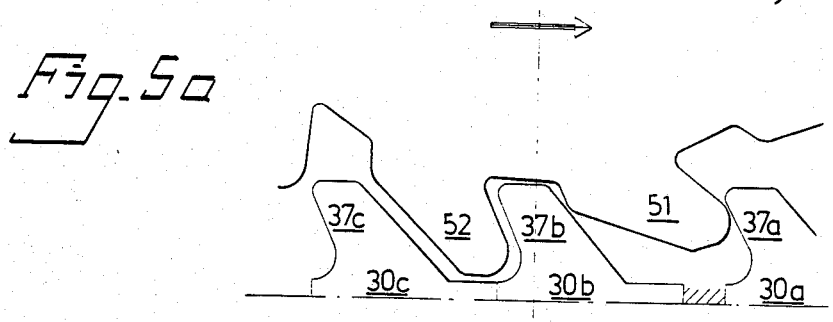
FIGS. 5a–c show cooperation between first and second gear means in different positions during the separation and ejection phase.

FIG. 5a shows a position in which a tooth 52 of a gear wheel 13, 14, 13', 14' just entered into the space between the gear means 37b and 37c, while the tooth 51 on one hand gives the box 30a situated closest to the exit 3 a final push out of the container 2 and on the other hand prevents the box 30b from leaving the container 2. During the counterclockwise rotation of the gear wheel to the position shown in FIG. 5b the chaff boxes 30b and 30c are moved closer to the exit and the tooth 52 opens the latching means by pressing aside the projection 43. The latching means are shown in more detail in FIGS. 6a and 6b, FIG. 6b showing a positon which corresponds to that of FIG. 5b.

Figure 5B:
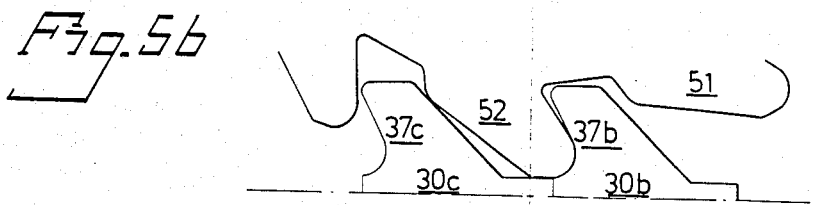
Figure 6B:
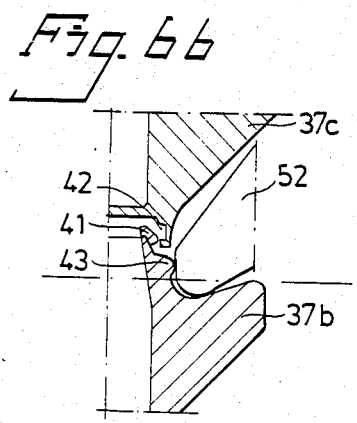
FIGS. 6a–b show the latching means connecting two adjacent boxes, FIG. 6a showing the situation before separation of adjacent boxes corresponding to FIG. 5a and FIG. 6b showing the situation during separation of adjacent boxes according to FIGS. 5b and 5c.
Figure 6A:
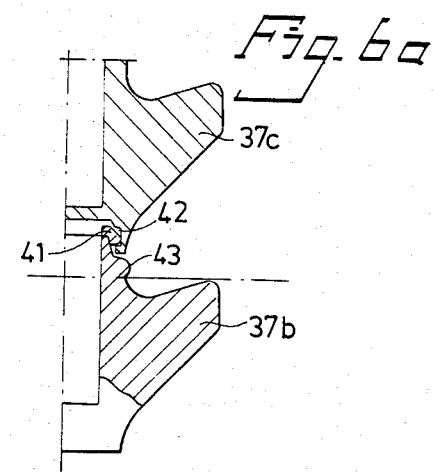

When in the position shown in FIG. 5b the tooth 52 begins to engage both the gear means 37b in front of and the gear means 37c behind the tooth.

Figure 5C:
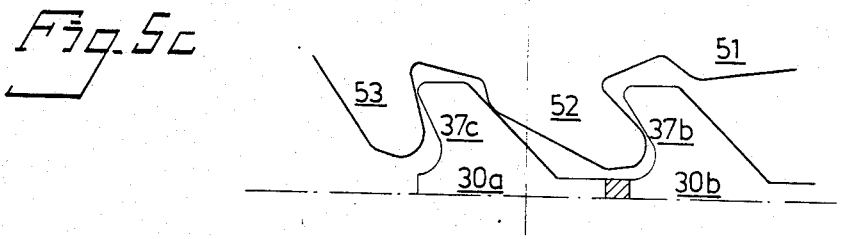

During the counter-clockwise rotation of the gear wheels from the position shown in FIG. 5b to the position shown in FIG. 5c the tooth 52 tends to increase the distance between the gear means 37b and 37c, so that the box 30b situated closest to the exit 3 starts to separate from the train of chaff boxes situated behind it. At the same time the tooth 53 ensures that the train of chaff boxes is moved towards the exit.

During the continued counter-clockwise rotation of the gear wheels from the position shown in FIG. 5c the tooth 52 moves nearer to the position of the tooth 51 in FIG. 5a. The box 30b situated closest to the exit is completely released from the boxes lying behind during the last mentioned rotation and is given a push out of the container by the tooth 52.

The ejection of additional boxes is performed in the same way as described above for the box 30b.

In the embodiment shown the exit is provided with a total of four gear wheels 13, 14, 13', 14'. However, it is possible to increase or decrease the number of gear wheels. For example, embodiments with only one or two gear wheels are possible.

The driving of the gear wheels 13, 14, 13', 14' at the exit 3 of the container may be performed step by step or continuously during a limited period of time.

In the described embodiment driving belts are used for driving of the gear wheels at the exit 3 of the container. These belts may be perforated and cooperate with belt pulleys provided with teeth. Alternatively, the belt driving may be replaced by a wire or chain driving.

Furthermore, it is possible to replace the described piston transport by other constructions. In one simple variant the piston is omitted and the gear wheels 13, 13' serve both for the transport and for the ejection. The driving motor may be located in direct connection with the gear means 12, 12' which may be coupled via further gear wheels.

In addition it is to be noted that the described principle for ejection of boxes from a container may be used also in devices other than chaff ejection devices. The principle may be used for example in vending machines for food articles or assembly lines for sequentially feeding out products from the line.

What is claimed is:

1. A transport mechanism for dispensing boxes having a predefined configuration from a container having an opening through which the boxes are ejected, characterized in that:
   (a) each of said boxes includes a gear engagement means for facilitating transport of the box, and a movable latching member for connecting said box to an adjacent one of said boxes; and
   (b) the container includes, near the opening, rotatable gear means having gear teeth shaped and arranged to successively;
      1. positively engage the gear engagement means of the box closest to the opening;
      2. pull said box and all other boxes connected together by said movable latching members toward the opening;

3. depress the movable latching member connecting said closest box and the next closest box to break the connection; and
4. eject said closest box through the opening in the container.

2. A transport mechanism as in claim 1 including a piston slidably arranged in the container and spring biased against a train of the connected boxes to urge them toward the opening.

3. A transport mechanism as in claim 1 or 2 where each of said boxes has two opposite side walls on each of which are provided one of the gear engagement means.

4. A transport mechanism as in claim 1 or 2 where each of said boxes is adapted for containing chaff and for releasing said chaff when the box is ejected from the container.

5. A transport mechanism as in claim 4 where each of the boxes has an open side shaped for cooperating with a facing side of the adjacent box to effect closure of the open side when the adjacent boxes are in contact with each other.

6. An apparatus for dispensing packages of chaff from a container having an opening throgh which the packages are to be ejected, said apparatus including a transport mechanism for controllably ejecting the packages independently of the force of gravity, said transport mechanism including:
   (a) engagement means attached to each package;
   (b) indexing means located adjacent to the opening of the container, said indexing means being configured such that:
      1. while inactivated, said indexing means is positively engaged with the engagement means of the package closest to the opening, thereby securing it in place;
      2. while activated, said indexing means forcefully ejects said closest package through the opening and positively engages the engagement means of the next closest package; and
   (c) advancing means cooperatively associated with the indexing means for positively advancing the packages toward the indexing means, said advancing means comprising:
      1. respective latching members for detachably connecting each package to an adjacent package; and
      2. a piston slidably-arranged in the container for urging a train of the connected packages toward the indexing means;
   said indexing means furthr including means for unlatching the latching member connecting the package closest to the opening from the next-closest package.

7. An apparatus as in claim 6 where the indexing means comprises rotatable gear means and where the piston is attached to the rotatable gear means by a drive belt, said drive belt effecting movement of the piston toward the indexing means during activation of the indexing means.

8. An apparatus as in claim 6 or 7 where each of the packages has an open side shaped for cooperating with a facing side of the adjacent package to effect closure of said open side when the adjacent packages are in contact with each other.

9. An improved apparatus for dispensing packages from a container having an opening through which the packages are to be ejected, wherein the improvement comprises a transport mechanism for controllably ejecting the packages independently of the force of gravity, said transport mechanism including:
   (a) engagement means attached to each package;
   (b) indexing means located adjacent to the opening of the container, said indexing means being configured such that:
      1. while inactivated, said indexing means is positively engaged with the engagement means of the package closest to the opening, thereby securing it in place;
      2. while activated, said indexing means forcefully ejects said closest package through the opening and positively engages the engagement means of the next closest package; and
   (c) advancing means cooperating associated with the indexing means for positively advancing the packages toward the indexing means;
   said advancing means comprising respective connecting means for detachably connecting each package to an adjacent package; and
   said indexing means being adapted to disconnect the connecting means connecting the package closest to the opening from the next closest package.

10. An apparatus as in claim 9 where the indexing means includes gear teeth which are shaped and arranged to successively:
    (a) positively engage the engagement means of the package closest to the opening;
    (b) advance said package and all other packages connected together by the connecting means toward the opening;
    (c) disconnect the connecting means connecting the package closest to the opening from the next closest package; and
    (d) forcefully eject said closest package through the opening.

11. An apparatus as in claim 10 where the connecting means comprises a latching member adapted to be unlatched by one of the gear teeth of the indexing means.

12. An apparatus as in claim 9 where the advancing means includes a piston slidably arranged in the container for urging the packages toward the indexing means.

* * * * *